United States Patent
Hasselgren et al.

(10) Patent No.: US 9,934,604 B2
(45) Date of Patent: Apr. 3, 2018

(54) CULLING USING MASKED DEPTHS FOR MSAA

(71) Applicant: Intel Corporation, Santa Clara, CA (US)

(72) Inventors: Jon N. Hasselgren, Bunkeflostrand (SE); Magnus Andersson, Helsingborg (SE)

(73) Assignee: Intel Corporation, Santa Clara, CA (US)

(*) Notice: Subject to any disclaimer, the term of this patent is extended or adjusted under 35 U.S.C. 154(b) by 126 days.

(21) Appl. No.: 14/141,606

(22) Filed: Dec. 27, 2013

(65) Prior Publication Data

US 2015/0187125 A1 Jul. 2, 2015

(51) Int. Cl.
G06T 15/40 (2011.01)

(52) U.S. Cl.
CPC .................. G06T 15/405 (2013.01)

(58) Field of Classification Search
USPC ........................................................ 345/422
See application file for complete search history.

(56) References Cited

U.S. PATENT DOCUMENTS

| | | | | |
|---|---|---|---|---|
| 7,450,120 | B1 * | 11/2008 | Hakura | G06T 15/005 345/421 |
| 7,683,901 | B2 * | 3/2010 | Tsao | G06T 15/40 345/422 |
| 7,755,624 | B1 * | 7/2010 | Hakura | G06T 15/005 345/421 |
| 9,558,585 | B2 * | 1/2017 | Nystad | G06T 15/40 |
| 2004/0119709 | A1 * | 6/2004 | Strom | G06T 15/40 345/421 |
| 2006/0209065 | A1 * | 9/2006 | Lapidous | G06T 15/40 345/422 |
| 2007/0268290 | A1 * | 11/2007 | Naoi | G06T 15/405 345/422 |
| 2007/0268291 | A1 * | 11/2007 | Naoi | G06T 15/405 345/422 |
| 2007/0273689 | A1 * | 11/2007 | Tsao | 345/422 |
| 2009/0091577 | A1 * | 4/2009 | Brothers | 345/506 |
| 2012/0183215 | A1 * | 7/2012 | Van Hook et al. | 382/166 |
| 2012/0299910 | A1 * | 11/2012 | Liang | G06T 15/405 345/419 |
| 2013/0106902 | A1 * | 5/2013 | Lourcha et al. | 345/611 |
| 2013/0141445 | A1 * | 6/2013 | Engh-halstvedt et al. | 345/506 |
| 2014/0267258 | A1 * | 9/2014 | Yang | G06T 15/405 345/422 |
| 2014/0354634 | A1 * | 12/2014 | Amsinck et al. | 345/420 |
| 2015/0062154 | A1 * | 3/2015 | Ellis et al. | 345/619 |
| 2015/0109293 | A1 * | 4/2015 | Wang | G06T 15/405 345/422 |

* cited by examiner

Primary Examiner — Kimbinh T Nguyen
(74) Attorney, Agent, or Firm — Trop Pruner & Hu, P.C.

(57) ABSTRACT

In accordance with some embodiments, a full per sample coverage mask may be used for a subset of the pixels in the tile, thereby enabling pixels that belong to multiple depth ranges to be handled. This makes the depth bounds a tighter fit for the true depth range of the tile and improves hierarchical depth culling efficiency when MSAA is used.

30 Claims, 11 Drawing Sheets

CULLING USING MASKED DEPTHS FOR MSAA

BACKGROUND

This relates generally to graphics processing and, specifically, to occlusion culling.

Culling means "to remove from flock," and in graphics, it boils down to removing work that does not alter the final image. This includes, for example, view frustum culling, where objects that are outside the view frustum are not further processed, since they will not affect the final image.

In maximum depth culling, often called hierarchical occlusion culling, the maximum depth, $z_{max}$, of a tile is stored and maintained per tile. If the estimated conservative minimum depth of a triangle inside a tile is greater than the tile's $z_{max}$, then the triangle is completely occluded inside that tile. In this case, the per-sample depth values do not need to be read from memory, and no further processing is needed within the tile for that triangle. This technique is sometimes called $z_{max}$-culling. In addition, one may also store the minimum depth, $z_{min}$, of the depths in a tile, and avoid depth reads if a triangle fully covers a tile, and the triangle's estimated conservative maximum depth is smaller than the $z_{min}$, in which case the triangle will overwrite all depths in the tile (assuming no alpha/stencil test etc).

The $z_{max}$ is computed from the per-sample depths in a tile. Ideally, the $z_{max}$-value of a tile should be recomputed every time a depth whose value is $z_{max}$ is overwritten.

A depth culling unit stores the $z_{max}$-representation, which may be accessed through a cache, for example. A tile may hold plane equations from the triangles that covers the tile, and for subsequent triangles culling can be done immediately against that representation (either against the evaluated depths from the plane equations, or by computing $z_{max}$ of the plane equations inside the tile). When the tile can no longer maintain this representation, due to storage requirements or other criteria, the plane equations may be replaced by one or many $z_{min}$- and $z_{max}$-values for the entire tile, or for subtile regions of the tile. For example, an 8×8 tile could hold two $z_{min}$ and two $z_{max}$ for each of the 4×8 subtile regions. Unless a feedback is used, sending computed $z_{max}$ values back from the depth buffer unit to the hierarchical occlusion culling unit, the $z_{max}$-values needs to be conservatively updated and will in general stay the same, unless an entire subtile is fully covered by a triangle.

Multi-sampled anti-aliasing (MSAA) is a type of super-sampling. Generally, the renderer evaluates a fragment program, once per pixel, and only truly supersamples the depth and stencil values. In general, multi-sampling refers to a special case of supersampling where only some components of the final image are not fully supersampled.

Anti-aliasing is any technique to combat aliasing in a sampled signal to smooth images rendered by computer generated imagery. Attempts to overcome jaggies which are stair step like lines that should have been smooth.

BRIEF DESCRIPTION OF THE DRAWINGS

Some embodiments are described with respect to the following figures.

DETAILED DESCRIPTION

Figure 1A:
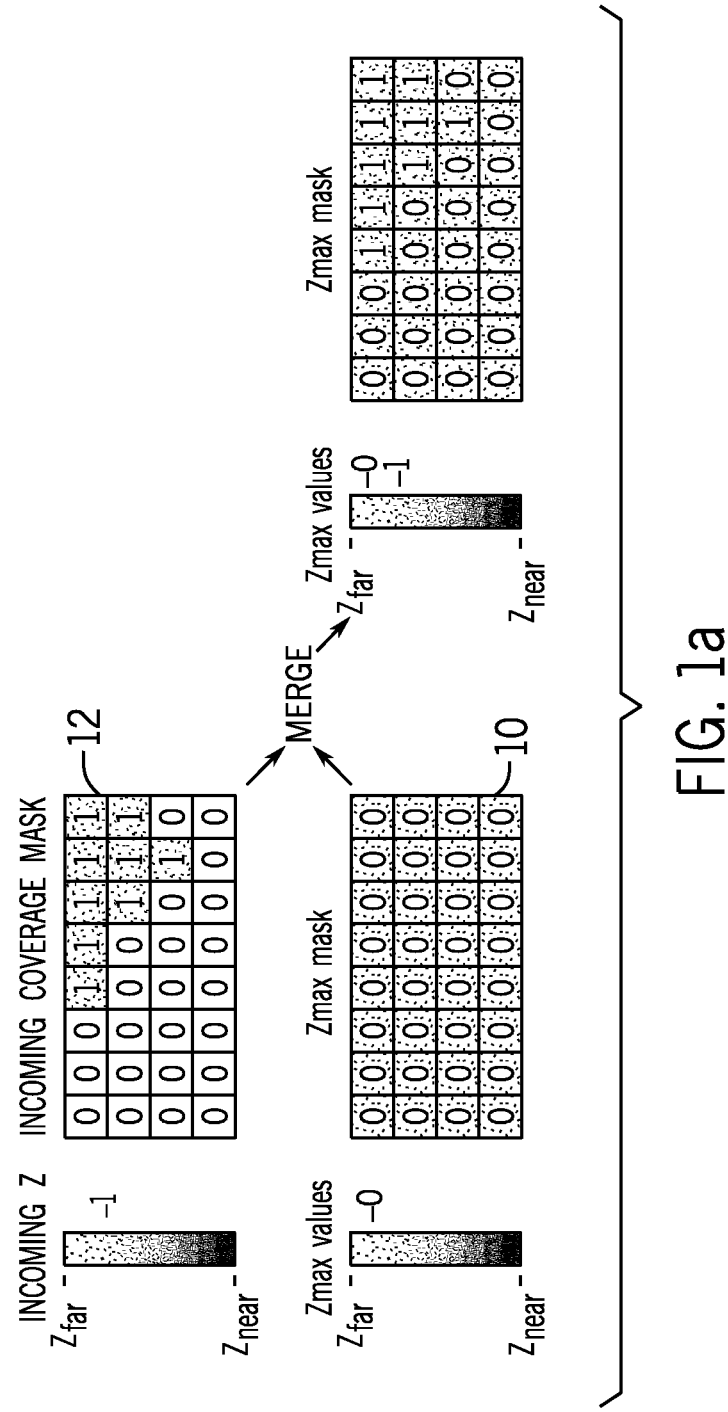
FIGS. 1a to 1d are depictions of different $z_{max}$ update scenarios.
Figure 1B:
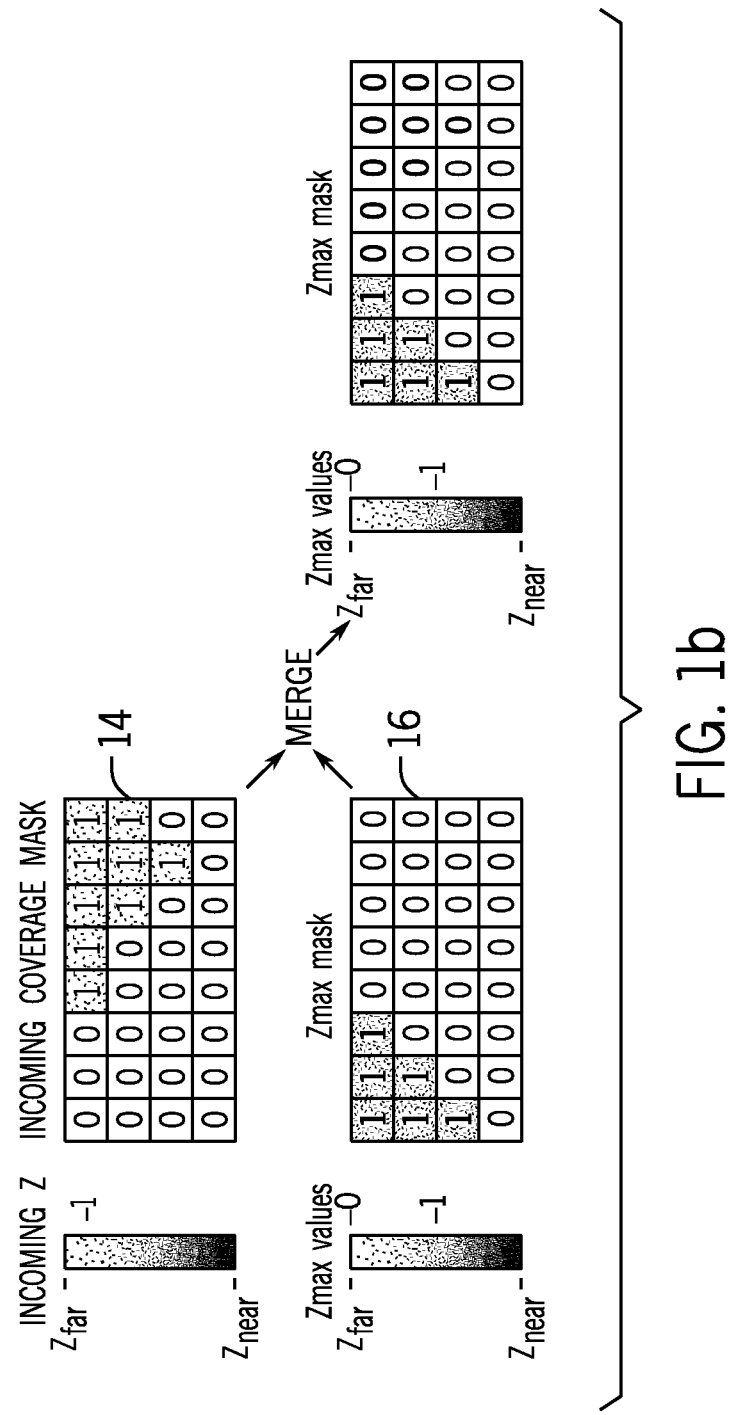
Figure 1C:
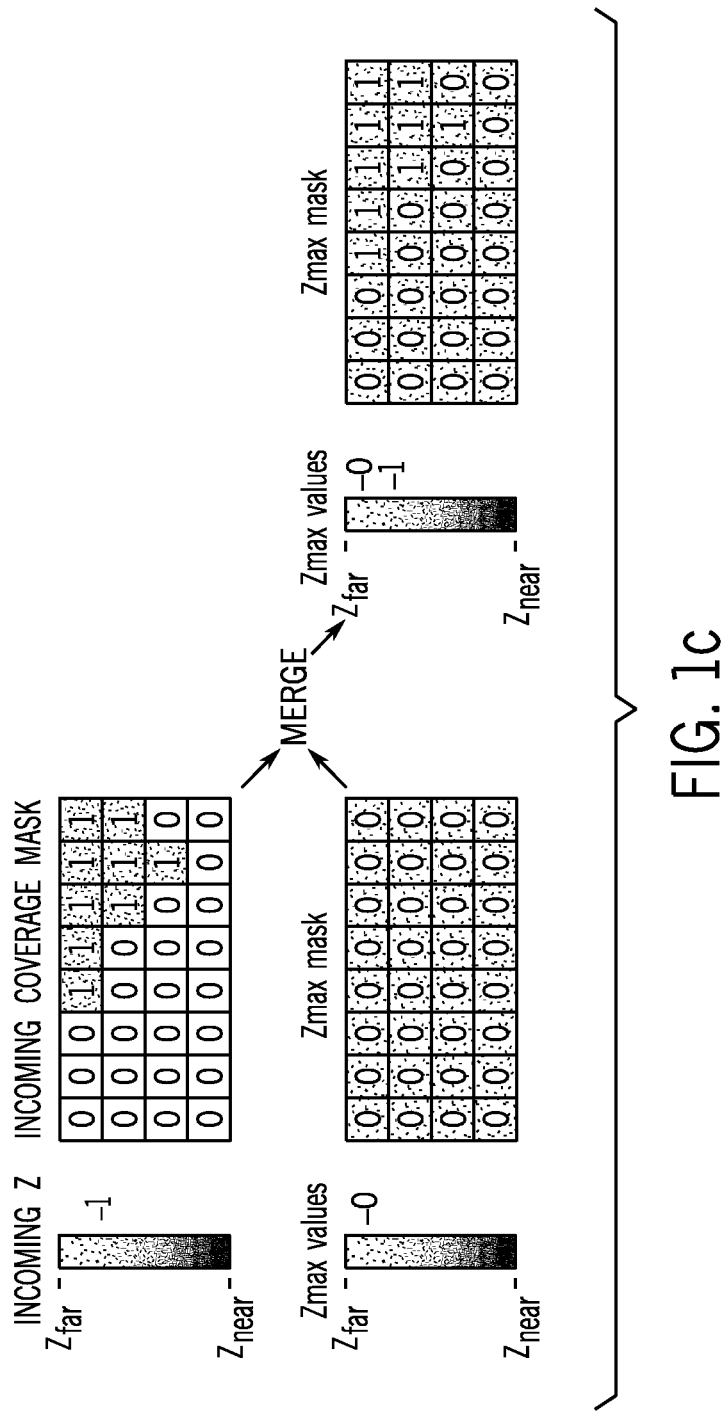
Figure 1D:
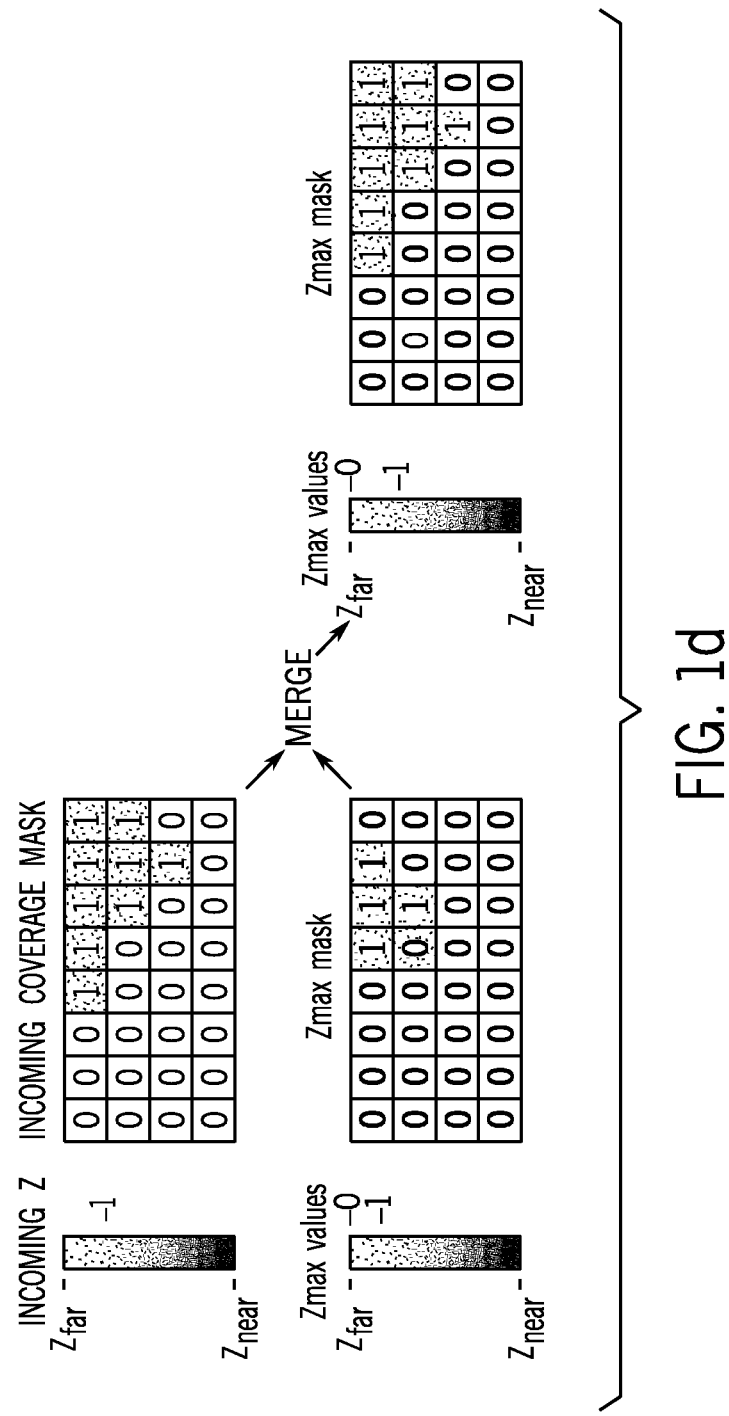

In one embodiment, two or more $z_{max}$-values are maintained per tile, together with a $z_{max}$-mask, which stores $\log_2 n$ bits per depth sample, where n is the number of $z_{max}$-values. In a simple case described herein, only two layers are used, but more layers may be used in other embodiments. This means that each tile stores two $z_{max}$-values. Let us denote them as $z_{max_i}$, $i \in \{0,1\}$. In addition, each depth sample will have a single bit indicating whether that sample uses $z_{max_0}$ or $z_{max_1}$ as its maximum depth. When a triangle is rasterized inside a tile, a coverage mask is generated. The coverage mask has one bit per sample in the tile, and each bit is set to one if it is covered by the triangle and does not unambiguously fail the conservative depth test in the depth culling unit.

Several scenarios can occur when a triangle is being rendered to a tile. These scenarios are described below.

1. The triangle covers some portion of a tile, and the triangle is in front of the $z_{min}$'s of the tile, and storage (and other) criteria allows the tile to represented in plane mode. In this case, the plane equation of the triangle can be added to a plane encoded representation instead of using $z_{max}$-values and the $z_{max}$-mask.

2. The tile is completely culled, and therefore the processing of the triangle for that tile is finished. Mask-culling is described below.

3. Due to an incoming triangle, a tile cannot be represented as a number of plane equations. In this case, $z_{max}^{tri}$ (and possibly $z_{min}^{tri}$) is computed for the triangle and tile. One of the following events may then occur:

(a) The samples, which are not covered by the triangle, have $z_{max}$-mask bits that are all set to b (either 0 or 1). This means that $z_{max_{(1-b)}}$ to is unused and available. Therefore, the $z_{max}$-mask bits for the samples covered by the triangle are set to 1−b, and $z_{max_{(1-b)}}$ set to $z_{max}^{tri}$.

(b) If the $z_{max}$-mask sample bits, which are not covered by the triangle, contain both 0's and 1's, then the three values $z_{max}^{tri}$, $z_{max_0}$ and $z_{max_1}$, are merged into two values, and the $z_{max}$-mask bits for the samples that the triangle covers are updated. Merging strategies are described further below.

(c) If plane mode compression was invoked for a tile in step 1 above, then the tile is in plane mode for a later triangle that partially overlaps the tile. If the incoming triangle partially covers the tile, we set the new coverage mask as the $z_{max}$-mask. The $z_{max_0}$ will then be the max value of the triangles that previously occupied the tile (in plane mode), and $z_{max_1}$ will be set to $z_{max}^{tri}$.

(d) If either all of the 0's or 1's in the $z_{max}$-mask are overwritten by an incoming coverage mask, there is no need to determine which values to merge. The overwritten $z_{max}$-value simply assumes the $z_{max}^{tri}$-value of the incoming triangle, and the mask is updated accordingly.

An example of each of the events listed in scenario 3 is depicted in FIG. 1. In FIG. 1a, the existing triangle 10 in the incoming coverage mask covers the entire tile, so the incoming triangle 12 can simply insert its $z_{max}$-value and update the mask. In FIG. 1b, the tile already has two triangles. Two of the three triangles' $z_{max}$-values must be merged and form a new common mask region. In this case, the incoming triangles 14 and 16 lie closest in depth to each other and are thus merged. In FIG. 1c, the plane representation must be broken, and the existing and incoming triangles are each assigned one $z_{max}$-value and one $z_{max}$-mask bit value. Finally, in FIG. 1d, the incoming triangle covers an existing region in the mask, and simply claims the overwritten $z_{max}$.

Scenario 2 refers to mask culling. Since each tile has a $z_{max}$-mask, and two Zmax-values ($z_{max_0}$ and $z_{max_1}$), it is also possible to perform the occlusion culling against the masked representation. This means that the coverage mask (which is a bitmask with one bit per sample in the tile, and a bit is set to 1 if the triangle covers the samples, and otherwise 0) of the triangle is tested against the index bits. All the index bits together can be thought of as an index bitmask of the same size as the coverage mask. If a bit in the coverage mask is 0, then no culling needs to be done for those samples because the triangle is not covering the corresponding samples. However, for bits in the coverage mask that are set to 1, we need to perform culling against $z_{max_0}$ if the corresponding index bit is 0, and against $z_{max_1}$ if the corresponding index bit is 1.

Another way to put this is that the triangle should be culled against $z_{max_1}$ for the samples whose coverage mask bit AND:ed with the corresponding index bit is 1. Culling against $z_{max_0}$ should be done for the samples whose coverage mask bit AND:ed with the corresponding index bit inverted is 1. This is also expressed in the table below:

| Coverage mask bit | Index bit | Operation |
| --- | --- | --- |
| 0 | X | No culling to be done |
| 1 | 1 | Cull against $z_{max1}$ |
| 1 | 0 | Cull against $z_{max0}$ |

Also "cull against $z_{max_{0/1}}$" can be done in different ways. If the per sample depths have been computed, a masked per-sample depth test can be done against $z_{max_0}/z_{max_1}$. Alternatively, one can use the $z_{min}^{tri}$ to cull against the masked $z_{max_0}/z_{max_1}$. The first alternative provides the most accurate way to perform occlusion culling in some embodiments, while the second alternative requires less work as only $z_{min}^{tri}$ needs to be compared to $z_{max_0}/z_{max}$, and the coverage mask is updated accordingly. Note that previous $z_{max}$-culling methods only cull against a single $z_{max}$-value per rectangle of samples.

In scenario 3b above, the merge can be done in different ways. In general, there is a set of index bits (one index bit per sample), and $z_{max_0}$, $z_{max_1}$-values stored in the tile, while the incoming data from the triangle consists of a coverage mask and $z_{max}$. These three $z_{max}$-values ($z_{max_0}$, $z_{max_1}$, $z_{max}^{tri}$) need to be reduced to two $z_{max}$-values (and stored in $z_{max_0}$ and $z_{max_1}$). In the following we describe three different merging strategies, but one skilled in the art will realize that many other heuristics may be applied.

A. Out of the three values ($z_{max_0}$, $z_{max_1}$, $z_{max}^{tri}$), the two that are closest to each other are merged. The three distances to compare and the resulting $z_{max}$-values is listed below:

| Compared distance | New zMax value if the compared distance is the shortest |
| --- | --- |
| abs(Zmax0-Zmax1) | Zmax0 = max(Zmax0, Zmax1), Zmax1 = Zmaxtri |
| abs(Zmax0-Zmaxtri) | Zmax0 = max(Zmax0, Zmaxtri), Zmax1 = unchanged |
| abs(Zmax1-Zmaxtri) | Zmax1 = max(Zmax1, Zmaxtri), Zmax0 = unchanged |

B. This merging strategy is the same as in A, but instead of just comparing $z_{max}^{tri}$, we also compare $z_{max}^{tri}$ to $z_{max_0}$ and $z_{max_1}$. Thus, the comparisons and result $z_{max}$-values become:

| Compared distance | New zMax value if the compared distance is the shortest |
| --- | --- |
| abs(Zmax0-Zmax1) | Zmax0 = max(Zmax0, Zmax1), Zmax1 = Zmaxtri |
| abs(Zmax0-Zmaxtri) | Zmax0 = max(Zmax0, Zmaxtri), Zmax1 = unchanged |
| abs(Zmax1-Zmaxtri) | Zmax1 = max(Zmax1, Zmaxtri), Zmax0 = unchanged |
| abs(Zmax0-Zmintri) | Zmax0 = max(Zmax0, Zmaxtri), Zmax1 = unchanged |
| abs(Zmax1-Zmintri) | Zmax1 = max(Zmax1, Zmaxtri), Zmax0 = unchanged |

C. This merging strategy counts the 0's and 1's of the index mask that are overwritten by the coverage mask. It is less likely that the overwritten $z_{max}$-value is part of the surface currently being rendered and thus we can disfavor the overwritten $z_{max}$ when merging. While these merging strategies are examples, other variants and combinations are possible and easy to conceive.

Figure 2B:
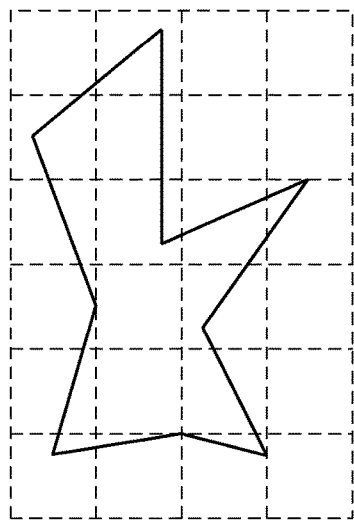
FIGS. 2a to 2d are depictions of different $z_{max}$ update strategies.
Figure 2D:
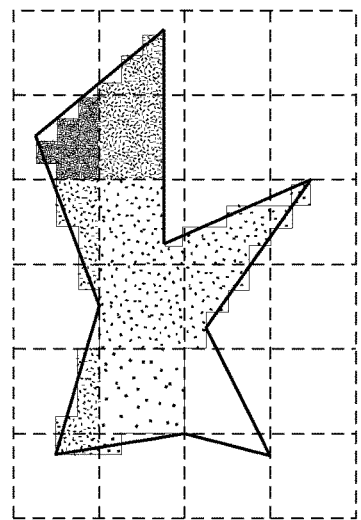
Figure 2A:
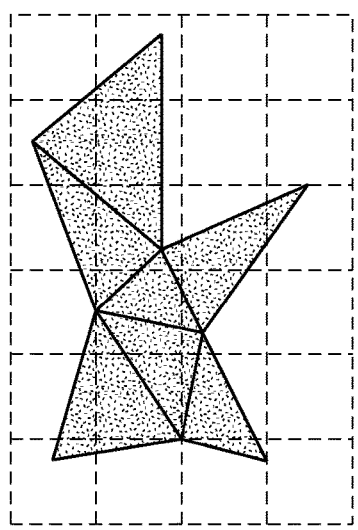
Figure 2C:
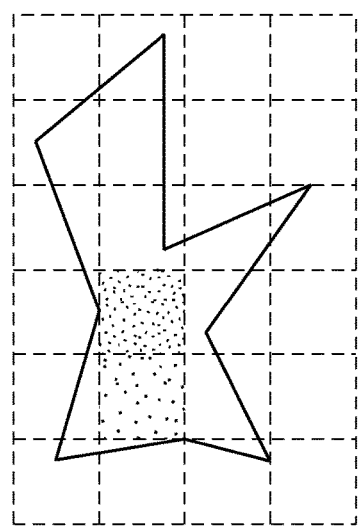

A benefit of having a $z_{max}$-mask for selecting between two $z_{max}$-values is that culling can be done on a per sample granularity instead of on fixed sized (sub-) tiles. This can be particularly beneficial for tiles that contains a geometric silhouette. The improvement in the covered region is illustrated in FIG. 2. Note FIGS. 2b-d show the different $z_{max}$ buffer representations after the mesh in 2a is rendered. In FIG. 2a, the object, consisting of seven triangles, is rendered triangle by triangle to a screen space region consisting of 12 tiles. In this example, the tiles are 4×4 pixels each, with one sample per pixel. The gradient illustrates varying depth values, with the darker grey being closer to the camera. In FIG. 2b, the conservative $z_{max}$ update is contained within the depth culling unit. In this example, no $z_{max}$ updates are possible. In FIG. 2c, with feedback from either the depth unit or at cache eviction, the $z_{max}$-values can be recomputed with the samples in the depth buffer. The maximum value for each 4×4 pixel tile is extracted, which is not optimal for silhouette tiles. FIG. 2d shows separating each tile into a foreground and a background $z_{max}$-value, using an embodiment of the invention with the first merging strategy (labeled A).

In practice, the majority of tiles do not contain silhouette edges, but contain instead interiors of objects. Hence, this effect may be small, but can sometimes help culling efficiency.

While only two $z_{max}$-layers have been discussed so far, it is possible to generalize the algorithm to include any number of layers. The proposed merging strategy can easily be reformulated to accommodate this.

Assume that we have a set of n $z_{max}$-values in a tile of size w×h samples. From the current triangle being rendered to a tile, we obtain a conservative $z_{max}^{tri}$-value. From all available z's we form the list: $S=(z_{max_1}$, Similar to before, we have a $z_{max}$-mask, M, with w×h, with entries ranging from [1,n], and a coverage mask, C, of the same size which contains 1's for the samples covered by the incoming triangle, and 0 otherwise. We only have room to store n $z_{max}$-values, and thus we must select two values and merge these to a new, combined entry. This is accomplished through the following steps.

First, merge M and C:

$$M_{ij} = \begin{pmatrix} n+1, & \text{if } C_{ij} = 1 \\ M_{ij}, & \text{otherwise} \end{pmatrix}, \quad (1)$$

$$i \in \{1 \ldots w\}, j \in \{1 \ldots h\}.$$

Next, perform a compaction step where we remove those entries from the list S which have no corresponding entries in the matrix M. The indices are then updated so that no gaps are present. If the list S now has n or fewer entries, the algorithm has completed (i.e. at least one old entry was entirely overwritten).

However, if the list S still has n+1 entries, we must perform a merge using our heuristic. For this we find the minimum distance, $d_{min}$, of any two entries in S and we store their indices (a and b) for later use. Conceptually this process can be described as:

$$d_{min} = \min_{a,b} |S_a - S_b|,$$

$$\text{for } a \in \{2 \ldots n+1\}, \text{ and } b < a,$$

Denote the minimum and maximum indices c=min(a, b) and d=max(a, b). Next, assign $S_c=\max(S_c,S_d)$ and remove the $d_{th}$ entry from S. All d $z_{max}$-mask bit entries from M may be overwritten:

$$M_{ij} = \begin{pmatrix} c, & \text{if } M_{ij} = d \\ M_{ij}, & \text{otherwise} \end{pmatrix}. \quad (2)$$

Finally, perform the same compaction step as described above to ensure that contiguous indices are used. Now n list entries in S are assured. The $z_{max}$-values in S and the $z_{max}$-mask M comprises now the new, masked $z_{max}$-representation used for culling.

This entire process may rely only on the data arriving from the rasterizer to the depth culling unit, i.e. no feedback is required in some embodiments. Conversely, there is no restriction to use feedback to improve the $z_{max}$-values.

In one embodiment, the $z_{max}$-mask scheme may hold a separate clear mask. This means that the cleared z-value may be stored in a separate mask.

Figure 3:
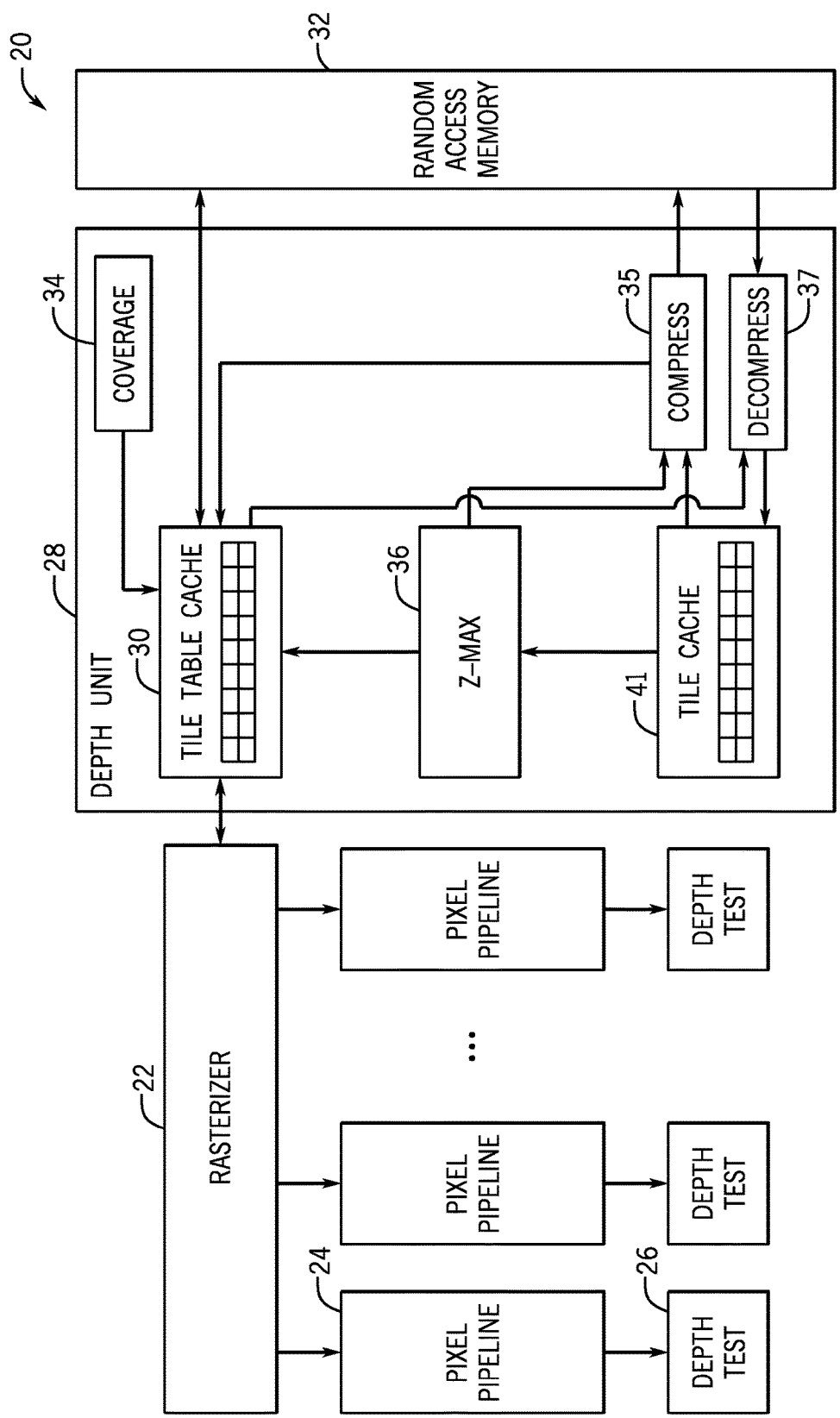
FIG. 3 is a schematic depiction of one embodiment.

Referring to FIG. 3, a depth buffer architecture 20 includes a rasterizer 22 to identify which pixels lie within the triangle currently being rendered. In order to maximize memory coherency for the rest of the architecture, it is often beneficial to first identify which tiles (a collection of W×H pixels) overlap the triangle. When the rasterizer finds a tile that partially overlaps the triangle, it distributes the pixels in that tile over a number of pixel pipelines 24. The purpose of each pixel pipeline is to compute the depth and color of a pixel. Each pixel pipeline contains a depth test unit 26, responsible for discarding pixels that are occluded by the previously drawn geometry. The depth unit 28 includes a memory 32, in one embodiment, that is a random access memory. It also includes a tile table cache 30 temporarily storing the $z_{max}$-mask representation for each tile and backed by the memory 32, a tile cache 41 which is also backed by the memory 32 and temporarily stores per-sample depth values for rapid access, optionally a $z_{max}$-feedback computation 36 which updates the $z_{max}$ representation in the tile table 30 each time a tile is evicted from the tile cache 41, a compressor 35, and a decompressor 37, as well as a coverage mask buffer 34. The tile table stores the a $z_{max}$ representation and header information, for example one or more flags indicating which compression algorithm is used to compress a tile of depth values, separately from the depth buffer data.

The compressor 35, in general, compresses the tile to a fixed bit rate and fails if it cannot represent the tile in a given number of bits without information loss. When writing a depth tile to memory, the compressor with the lowest bit rate is typically selected that succeeds in compressing the tile. The flags in the tile table are updated with an identifier unique to that compressor and compressed data is written to memory. When a tile is read from memory, the compressor identifier is read from the tile table and the data is decompressed using the corresponding decompression algorithm 37. A buffer 34 may store the coverage mask as well.

Figure 4:
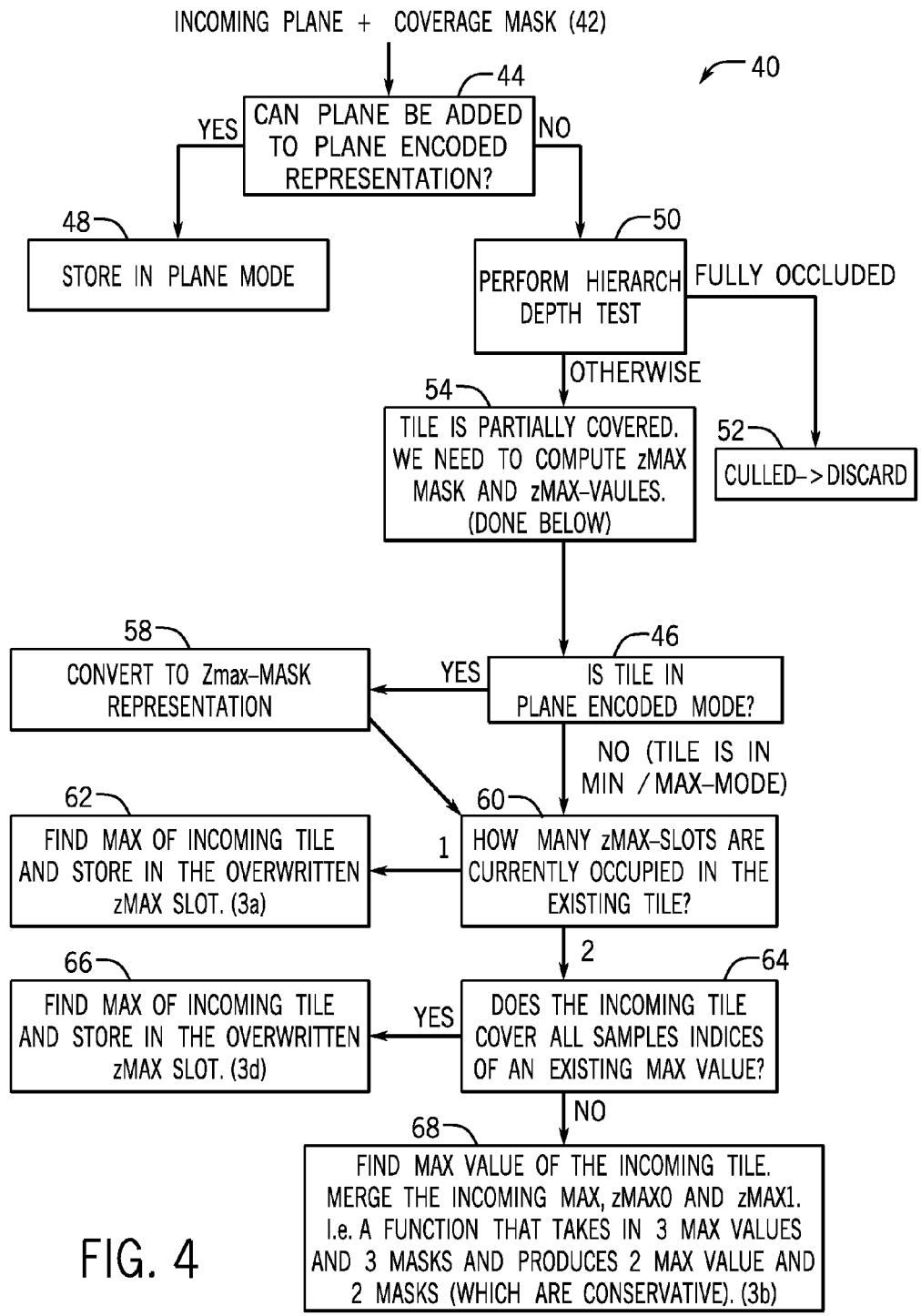
FIG. 4 is a flow chart for one embodiment of the present invention.

A sequence 40, shown in FIG. 4, may be implemented in software, firmware, and/or hardware. In software and firmware embodiments, it may be implemented by computer executed instructions stored in one or more non-transitory computer readable media, such as magnetic, optical, or semiconductor storages. For example, they may be stored in association with the graphics processing unit.

The sequence 40 begins by receiving an incoming plane with a coverage mask, as indicated at 42. A check at 44 determines whether the plane can be added to the plane encoding representation. Otherwise, block 50 performs hierarchical depth testing. If so, cull and discard (block 52). If all incoming samples are not covered by the existing tile, the tile is partially covered and a $z_{max}$ mask is computed, together with $z_{max}$ values (block 54). Then, a check at block 46 determines whether the tile is in plane mode. If so, the tile is converted to $z_{max}$-mask mode pursuant to scenario 3c, as indicated in block 58.

If a tile is not in the plane mode, then the tile is in the min/max mode and it is determined how many $z_{max}$ slots are currently occupied in the existing tile, at block 60. If it is one, the maximum of the incoming tile is found and stored in the free $z_{max}$ slot, pursuant to scenario 3a (block 62). If the number of slots is two, then a check at block 64 determines whether the incoming tile covers all sample indices in an existing maximum value. If so, the maximum of the incoming tile is found and stored in the overwritten $z_{max}$ slot, pursuant to scenario 3d, as indicated in block 66. If not, the maximum value of the incoming tile is found, as indicated in block 68. The incoming max, $z_{max_0}$ and $z_{max_1}$, are merged. That is, a function that takes in the three maximum values and the three masks and produces two maximum values and two masks, which are conservative as used, pursuant to scenario 3b.

If the algorithm is used together with multi-sampled anti-aliasing while only maintaining a per-pixel mask, each pixel may only belong to a single min/max depth range. However, pixels on triangle edges should either partially belong to one triangle depth range and are partially cleared, or may partially belong to two distinct depth ranges. For tiles containing such pixels, the depth clear value typically leaks into the depth ranges, making too coarse of an approximation of the true depth and ultimately hurting the culling efficiency.

In accordance with some embodiments, a full per sample coverage mask may be used for a subset of the pixels in the tile, thereby enabling a mix of pixels that belong to multiple depth ranges and are fully covered by a single layer. This makes the depth bounds a tighter fit for the true depth range of the tile and improves hierarchical depth culling efficiency when MSAA is used.

A layer selection index mask per sample for a subset of pixels in a tile may be selectively stored. The remaining pixels are implicitly treated as fully covered by one of the min/max layers, and therefore all samples in those pixels are assigned to the same layer. In some embodiments a compact mask representation enables MSAA targets to use culling techniques described above (FIGS. 1-4) with the same bit budget as single sampled targets.

After performing the sequence already described herein, additional steps may be implemented for MSAA. The following description assumes that each row is comprised of contiguous regions of pixels belonging to the same Zmax layer, henceforth called a "solid region". Each solid region is separated by a "break region", which is a region where indices are stored for every sample to indicate whether they belong to layer 0 or layer 1. After each break, an additional bit is stored to indicate if the following solid region belongs to layer 1 or layer 0. Furthermore, in some embodiments, a layer of the left region may be always assumed to be zero. If this is not the case, switching layer 0 and 1 ensures that the left region is implicitly zero.

In some embodiments, different configurations may be used for the breaks. For example, a single four pixel wide break may be supported for each row within the desired bit budget. Another alternative is to support two independent breaks, where one break can be two pixels wide; and the second break is only one pixel, giving fewer pixels but greater flexibility in where the pixels are positioned. It is also possible to select the break configuration while compressing and storing a few header bits to indicate which configuration was used for a particular tile.

The process of finding the solid regions and the break regions may be implemented as follows. First, a variable L equal to the Zmax layer index in the first sample in the first pixel is set. Then the sequence scans over all samples in all pixels, for example from left to right. Once a sample with a layer index that differs from L is found, the enclosing pixel is marked as a break B. After explicitly storing index bits for all samples in all pixels in the break region (starting from B and stretching over a number of pixels), L is reinitialized to be the layer index of the first sample in the first pixel after the break region, followed by an iterative search for the next break.

Figure 5:
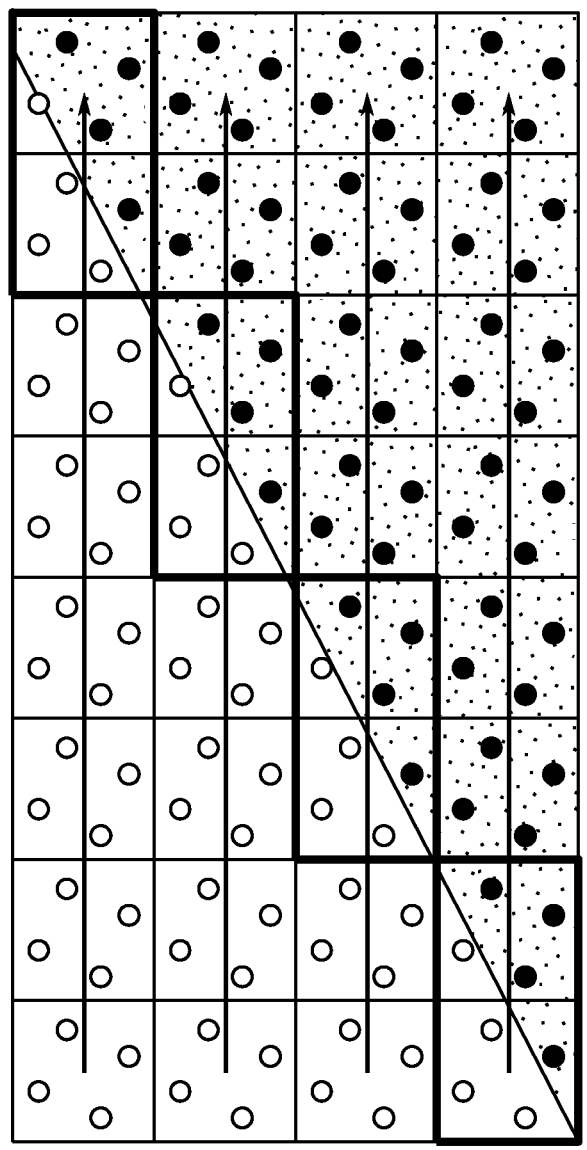
FIG. 5 is a depiction of a break point search for one embodiment.

This process is illustrated in FIG. 5. The sequence searches for the break point on each row, indicated by the arrows. Pixels with mixed sampled masks are found as indicated in the bold outlines and stored explicitly.

If a pixel row has too many breaks, then the technique described above in connection with FIGS. 1-4 may be used. In addition, if a row has fewer breaks than is supported by the format, fake breaks may be inserted with identical indices for all the samples in the end of the row. There is also a check whether the left region was zero. If not, then all indices are inverted and the two layers' Zmax values are swapped.

Storage for the break regions may vary by configuration. For example, if 4×MSAA is used, then the tile size is 4×4 pixels and a single two pixel break region may be used. Two bits indicate the horizontal coordinate of the break, 4×2=8 bits store the per sample mask for the break and one additional bit stores whether the region following the break have samples fully belonging to Zmax layer 0 or 1. This gives a total of 4×(3+8)=44 bits for all rows in the tile. With an example using 96 bit budget, this leaves 20 bits which is enough to store two max layers and one min value for the tile with 25 bit precision each.

As an optimization, since the breaks are 2 pixels wide, they only have 3 valid locations, with a total of $3^4=81$ combinations. It is therefore possible to store the position of all breaks in 7 bits instead of 8 bits. This optimization can be generalized to any set of parameters chosen.

Another example is to store two break regions for each row in the configuration discussed above. For configurations with many breaks, it can also make sense to encode the horizontal coordinate as an offset to reduce storage.

As this representation is lossless, yet more compact than the fully sampled mask, it can be fit into a smaller bit budget while still enjoying some of the added culling potential of the masked culling shown in FIG. 4.

It is also possible to swap axes and specify the breaks for vertical columns. Another variant to searching for breaks in column or in row order, is to have other space filling curves that fully or partially cover the tiles such as Hilbert or Morton curves. Nothing needs to be altered in these cases and the pixel order may be implicit from the mode. Furthermore, it is possible to assume that all solid regions to the left or right of the break region belong to the same Zmax layer. For the scenarios where this is common, a mode can be used where the layer information can be encoded in a single bit.

Figure 6:
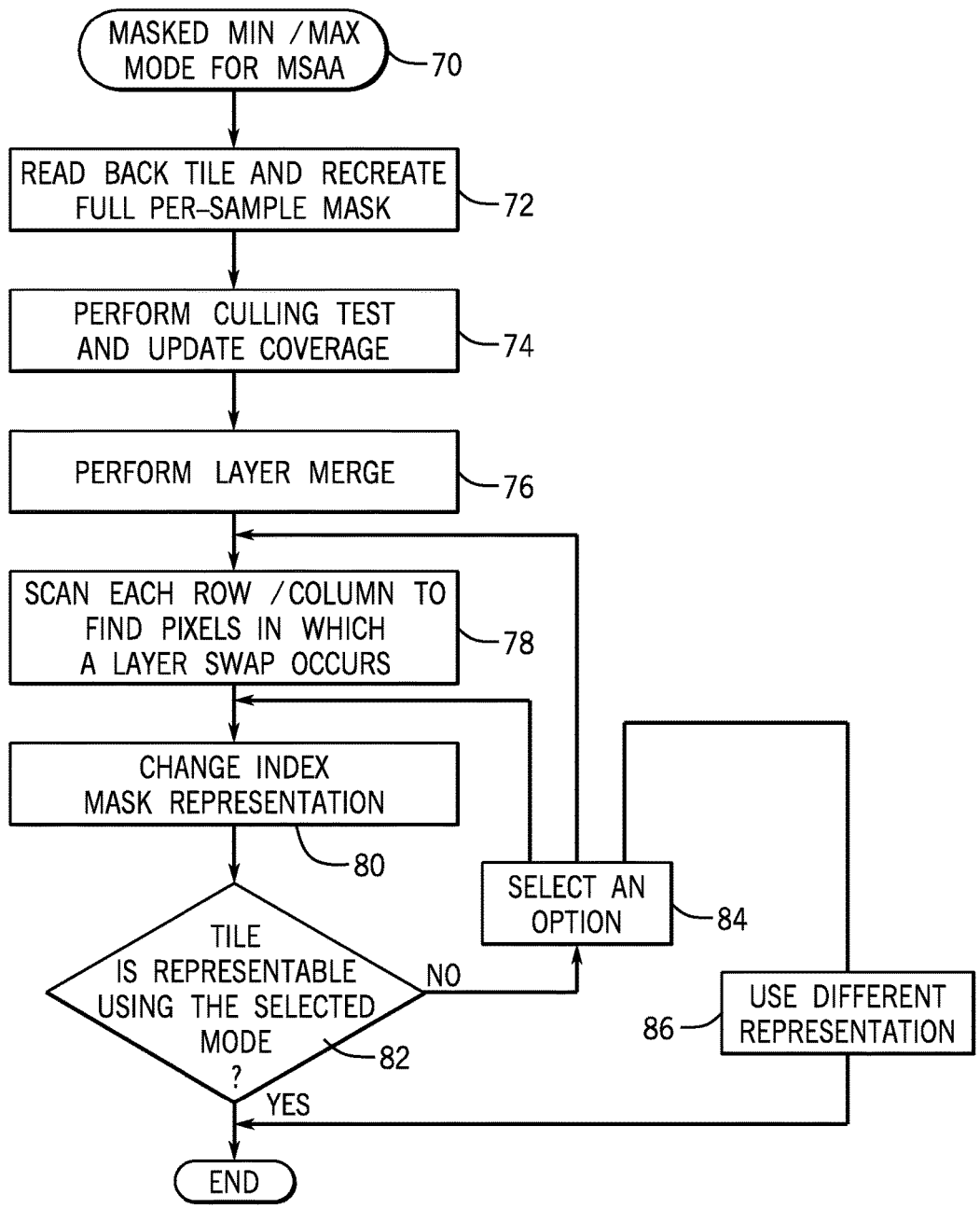
FIG. 6 is a flow chart for one embodiment.

In accordance with some embodiments, the sequence 70 shown in FIG. 6 may be implemented in software, firmware and/or hardware. In software and firmware embodiments it may be implemented by computer executed instructions stored in one or more non-transitory computer readable media such as a semiconductor, magnetic or optical storage. In one embodiment, the random access storage 32 may be used for this purpose as shown in FIG. 3.

The sequence 70, shown in FIG. 6, begins by reading back the tile and recreating the full per-sample mask (block 72). Then the culling test is performed followed by updating the coverage mask (block 74). Next a layer merge is performed as indicated in block 76.

Each row/column is scanned to find the pixels in which a layer swap occurs as indicated in block 78. These are the pixels that need to be represented with a per-sample mask. Next the index mask representation is changed (block 80) as described above.

A check at diamond 82 determines if the tile is not representable using the selected mode. If it is not, then an option must be selected at block 84. One option is to go back to block 78 using a different row/column orientation. Another option is to go back to block 80 with a different parameter setting. If no more variants are available, then another representation such as the original, per pixel Z-max mode or some other representation must be used as indicated in block 86.

Figure 7:
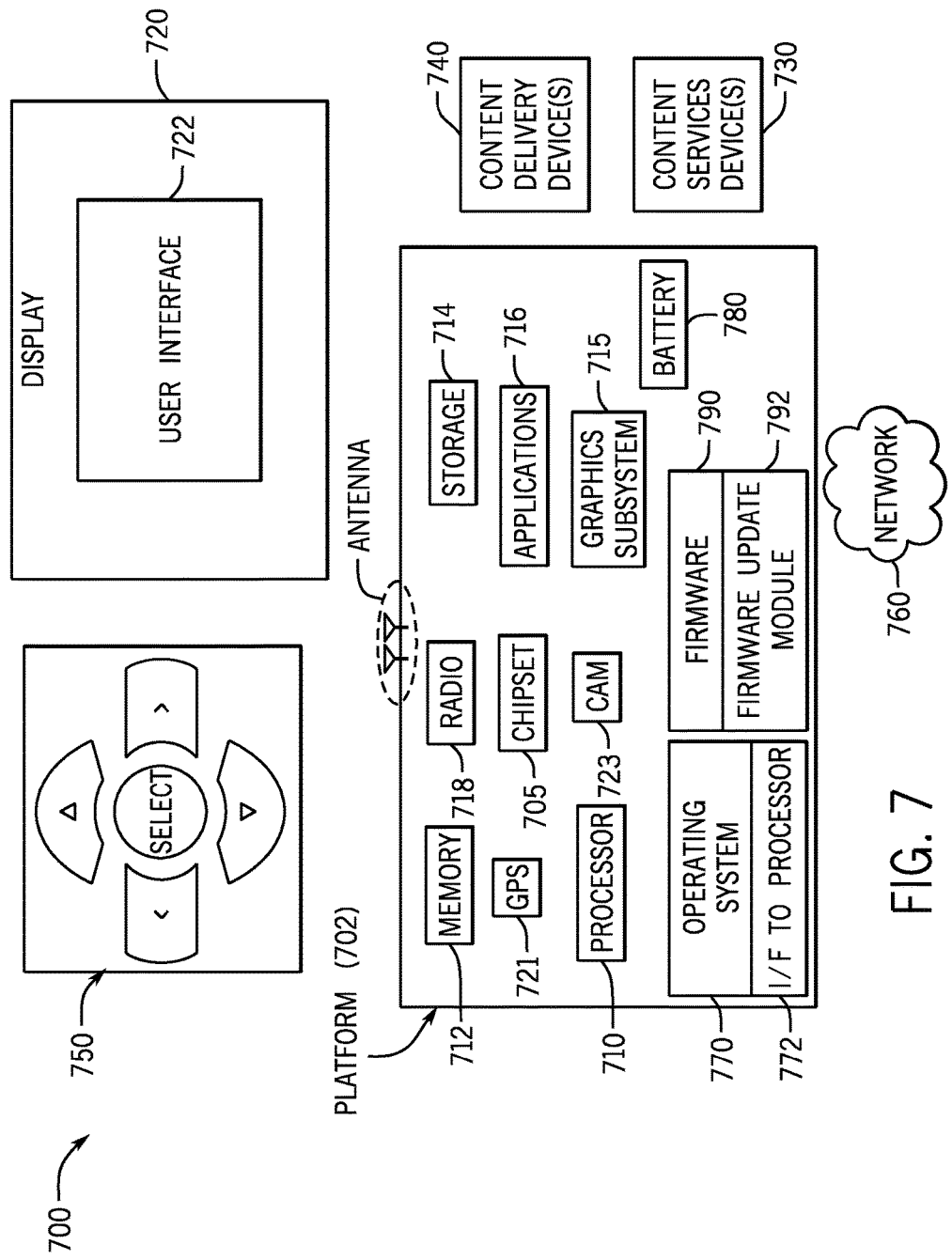
FIG. 7 is a system depiction according to one embodiment.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 6 in software and/or firmware embodiments.

Figure 8:
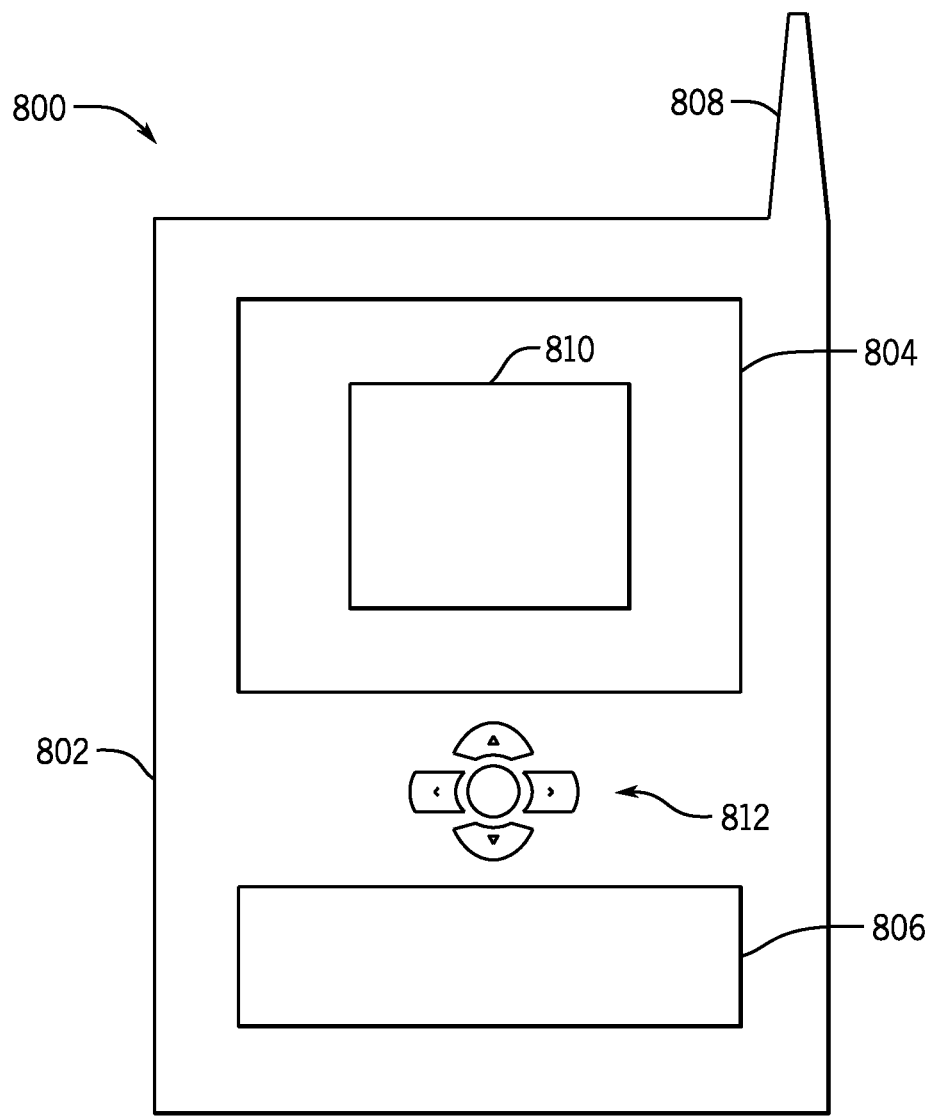
FIG. 8 is a front elevational view of one embodiment.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiments may be a method comprising performing culling of graphics primitives using more than one maximum depth value per tile. The method may also include using one bit per pixel or sample to indicate which maximum depth value a pixel or sample is connected to. The method may also include determining whether an incoming plane covers an entire tile. The method may also include, if not, determining whether all incoming samples are covered by an existing tile. The method may also include, if not, computing a maximum depth mask and maximum depth value. The method may also include, if not, determining how many maximum depth slots are currently occupied in an existing tile. The method may also include, if less than or equal to a predetermined number of available maximum depth slots, then finding the maximum of the incoming tile and storing in a free maximum depth slot. The method may also include, if more than a predetermined number of available maximum depth slots, determining whether all incoming tiles cover all sample indices of an existing maximum depth value. The method may also include, if so, finding the maximum of the incoming tile and storing in an overwritten maximum depth slot. The method may also include using only data from the rasterizer for depth culling. The method may also include using feedback and refining the Z representation mask when a tile is evicted. The method may also include, if not, finding the maximum value of the incoming tile and merging it with the available maximum depth values for one tile.

Another example embodiment may be at least one non-transitory computer readable medium storing instructions executed by a processor to perform a sequence comprising performing culling of graphics primitives using more than one maximum depth value per tile. The medium may include said sequence including using one bit per pixel or sample to indicate which maximum depth value a pixel or sample is connected to. The medium may include said sequence including determining whether an incoming plane covers an entire tile. The medium may include, if not, determining whether all incoming samples are covered by an existing tile. The medium may include, if not, computing a maximum depth mask and maximum depth value. The medium may include, if not, determining how many maximum depth slots are currently occupied in an existing tile. The medium may include, if less than or equal to a predetermined number of available maximum depth slots, then finding the maximum of the incoming tile and storing in a free maximum depth slot. The medium may include, if more than a predetermined number of available maximum depth slots, determining whether all incoming tiles cover all sample indices of an existing maximum depth value.

In another example embodiment may be an apparatus comprising a processor to cull graphics primitives using more than one maximum depth value per tile, and a memory coupled to said processor. The apparatus may include said processor to use one bit per pixel or sample to indicate which maximum depth value a pixel or sample is connected to. The apparatus may include said processor to determine whether an incoming plane covers an entire tile. The apparatus may include, if not, said processor to determine whether all incoming samples are covered by an existing tile. The apparatus may include, if not, said processor to compute a maximum depth mask and maximum depth value. The apparatus may include an operating system, a battery, and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   performing tile-based culling of graphics primitives for multi-sampled anti-aliasing; generating at least two selectable maximum depth values, each of said tiles having an entire area and each of said at least two maximum depth values being a maximum depth value for the entire area of only one tile;
   indicating for a depth sample which maximum depth value is used as the maximum depth for the sample; and
   culling one entire tile at a time using a selected one of said at least two maximum depth values.

2. The method of claim 1 including changing a per-sample mask indicating which maximum depth value layer each sample belongs to.

3. The method of claim 2 including finding and distinguishing between pixels in which all samples belong to the same layer, and pixels with samples from multiple layers.

4. The method of claim 3 including scanning by pixels row by row, column by column or in Morton order.

5. The method of claim 3, including storing per-sample indices for pixels containing multiple layers, and a single layer index for pixels, or a series of pixels, which fully belong to the same layer.

6. The method of claim 5, including storing break points to indicate where a change from a homogeneous region with a single index, to a region requiring per-sample indices occurs.

7. The method of claim 4 wherein if the tile is not representable, changing the scan order.

8. The method of claim 4 wherein if the tile is not representable, changing parameter settings.

9. The method of claim 1 including, if there are too few layer index changes then inserting fake breaks with identical indices for all the samples at the end of a column or row.

10. The method of claim 5 including checking whether a left region layer is zero and if not inverting all indices and swapping Z-max values for the two layers.

11. One or more non-transitory computer readable media storing instructions executed by a processor to perform a method comprising:
 performing tile based culling of graphics primitives for multi-sampled anti-aliasing;
 generating at least two selectable maximum depth values, each of said tiles having an entire area and each of said at least two maximum depth value values being a maximum depth value for the entire area of only one tile;
 indicating for a depth sample which maximum depth value is used as the maximum depth for the sample; and
 culling one entire tile at a time using a selected one of said at least two maximum depth values.

12. The media of claim 11, said method including changing a per-sample mask indicating which maximum depth value layer each sample belongs to.

13. The media of claim 12, said method including finding and distinguishing between pixels in which samples belong to the same layer, and pixels with samples from multiple layers.

14. The media of claim 13, said method including scanning by pixels rows by row, column by column or in Morton order.

15. The media of claim 13, said method including storing per-sample indices for pixels containing multiple layers, and a single layer index for pixels, or a series of pixels, which fully belong to the same layer.

16. The media of claim 15, said method including storing break points to indicate where a change from a homogeneous region with a single index, to a region requiring per-sample indices occurs.

17. The media of claim 14, wherein if the tile is not representable, said method changing the scan order.

18. The media of claim 14, wherein if the tile is not representable, said method changing the parameter settings.

19. The media of claim 11, if there are too few layer index changes then said method inserting fake breaks with identical indices for all the samples at the end of a column or row.

20. The media of claim 15, said method including checking whether a left region layer is zero and if not inverting all indices and swapping Z-max values for the two layers.

21. An apparatus comprising:
 a processor to cull tile based graphics primitives for multi-sampled anti-aliasing, generate at a time using at least two selectable maximum depth values, each of said tiles having an entire area and each of said at least two maximum depth values being a maximum depth value for the entire area of only one tile, indicate for a depth sample which maximum depth value is used as the maximum depth for the sample, and cull one entire tile at a time using a selected one of said at least two maximum depth values; and
 a storage coupled to said processor.

22. The apparatus of claim 21, said processor to change a per-sample mask indicating which maximum depth value layer each sample belongs to.

23. The apparatus of claim 22, said processor to find and distinguish between pixels in which all samples belong to the same layer, and pixels with samples from multiple layers.

24. The apparatus of claim 23, said processor to scan by pixels row by row, column by column or in Morton order.

25. The apparatus of claim 23, said processor to store per-sample indices for pixels containing multiple layers, and a single layer index for pixels, or a series of pixels, which fully belong to the same layer.

26. The apparatus of claim 25, said processor to store break points to indicate where a change from a homogeneous region with a single index, to a region requiring per-sample indices occurs.

27. The apparatus of claim 24 wherein if the tile is not representable, said processor to change the scan order.

28. The apparatus of claim 21 including a display communicatively coupled to the processor.

29. The apparatus of claim 21 including a battery coupled to the processor.

30. The apparatus of claim 21 including firmware and a module to update said firmware.

* * * * *